United States Patent [19]

Caroll et al.

[11] Patent Number: 4,612,953
[45] Date of Patent: Sep. 23, 1986

[54] FLUID COUPLING, SEAL REMOVAL TOOL AND METHOD

[75] Inventors: James E. Caroll; Steven R. Zillig, 8828 Main St., both of Williamsville, N.Y. 14221

[73] Assignee: Steven R. Zillig, Williamsville, N.Y.

[21] Appl. No.: 725,251

[22] Filed: Apr. 19, 1985

[51] Int. Cl.⁴ .............................................. F16L 37/28
[52] U.S. Cl. .................................. 137/327; 251/149.6; 251/362; 251/900
[58] Field of Search ............................ 137/327, 329.01; 251/362, 365, 900, 149.6

[56] References Cited

U.S. PATENT DOCUMENTS

| | | | |
|---|---|---|---|
| 515,290 | 2/1894 | Ives et al. | 137/327 |
| 2,777,716 | 1/1957 | Gray | 251/149.6 |
| 3,378,225 | 4/1968 | Snyder, Jr. | 251/149.6 |
| 3,715,099 | 2/1973 | Shendure | 251/149.6 |
| 4,366,945 | 1/1983 | Bläuenstein | 251/149.6 |

FOREIGN PATENT DOCUMENTS 2042044 3/1972 Fed. Rep. of Germany ...... 137/327

Primary Examiner—A. Michael Chambers
Attorney, Agent, or Firm—Christel, Bean & Linihan

[57] ABSTRACT

A novel fluid coupling, a novel tool for removing a coupling seal from the novel fluid coupling, and the method of utilizing the coupling seal removal tool. The coupling 10 includes a check valve 58 which has a skirt portion 64 normally disposed within a coupling seal when either a male coupling 12 is connected to it, or when the male coupling has been removed. The female coupling is so designed that the skirt of the check valve can be entirely shifted outside of the coupling seal 62 when the novel seal removal tool 68 is inserted into the open end of the coupling. The tool is provided with a knife edge (between surfaces 82 and 84) which can engage the inner annular surface of the seat 62 and cause the seal to be removed when the tool is removed from the open end of the female coupling.

6 Claims, 7 Drawing Figures

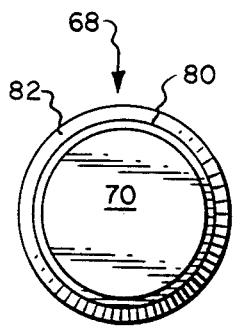
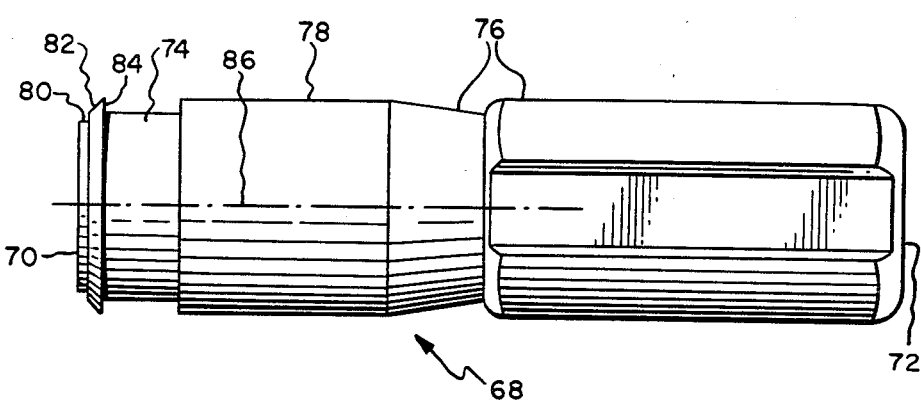
Fig. 3.
Fig. 2.
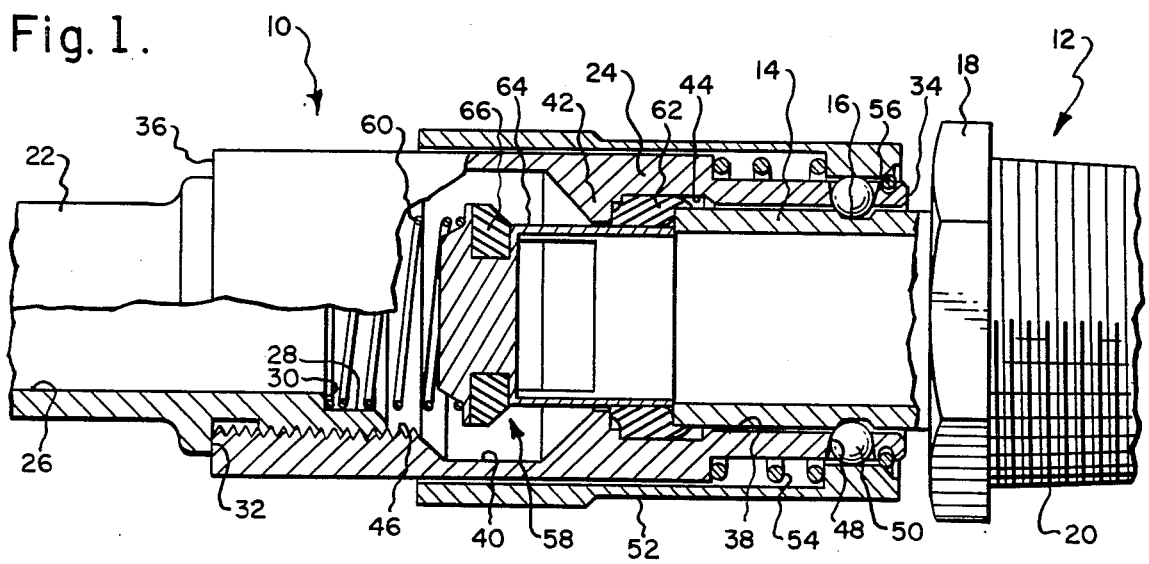
Fig. 1.
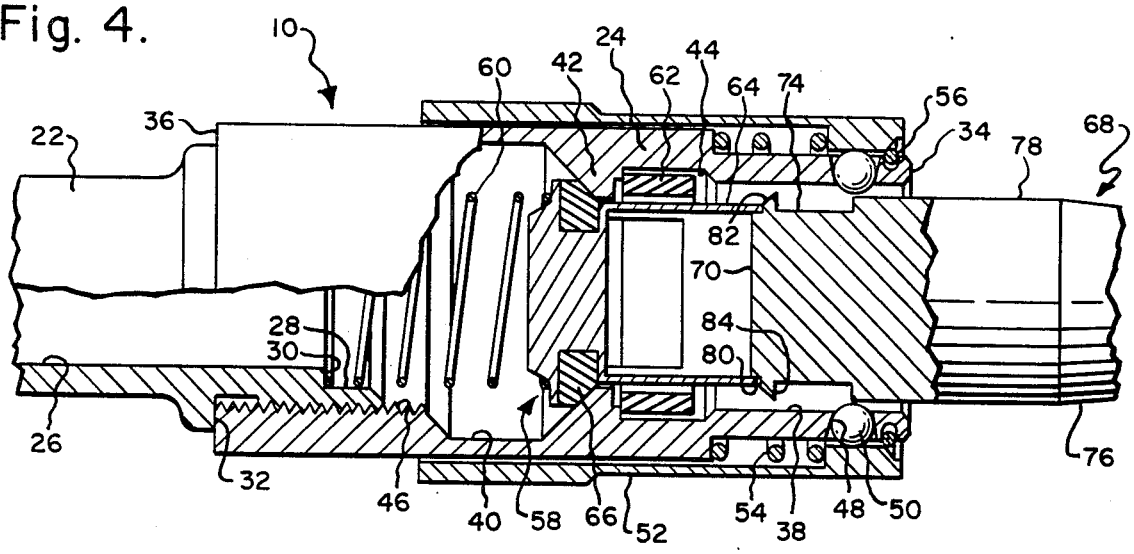
Fig. 4.

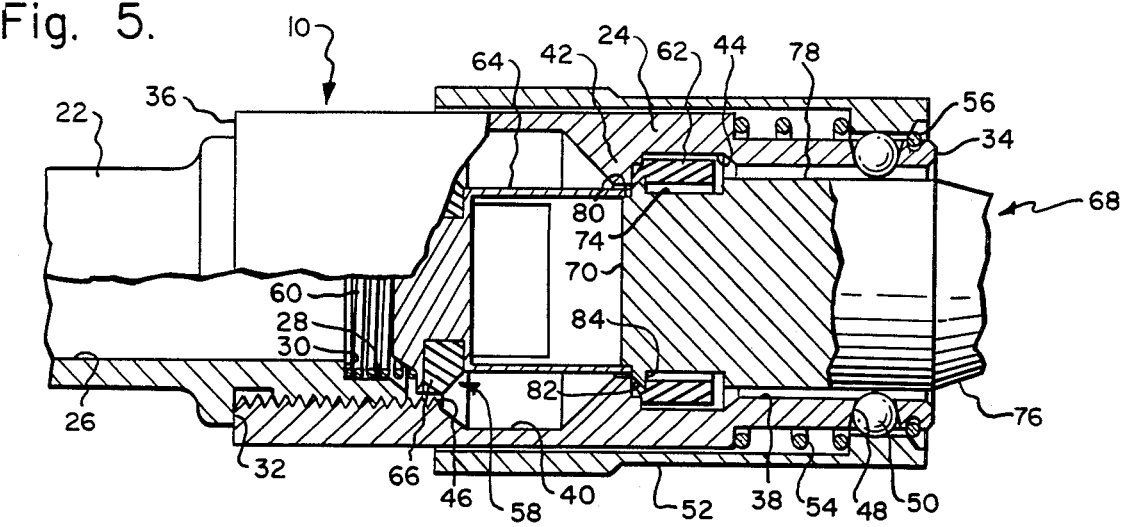
Fig. 5.
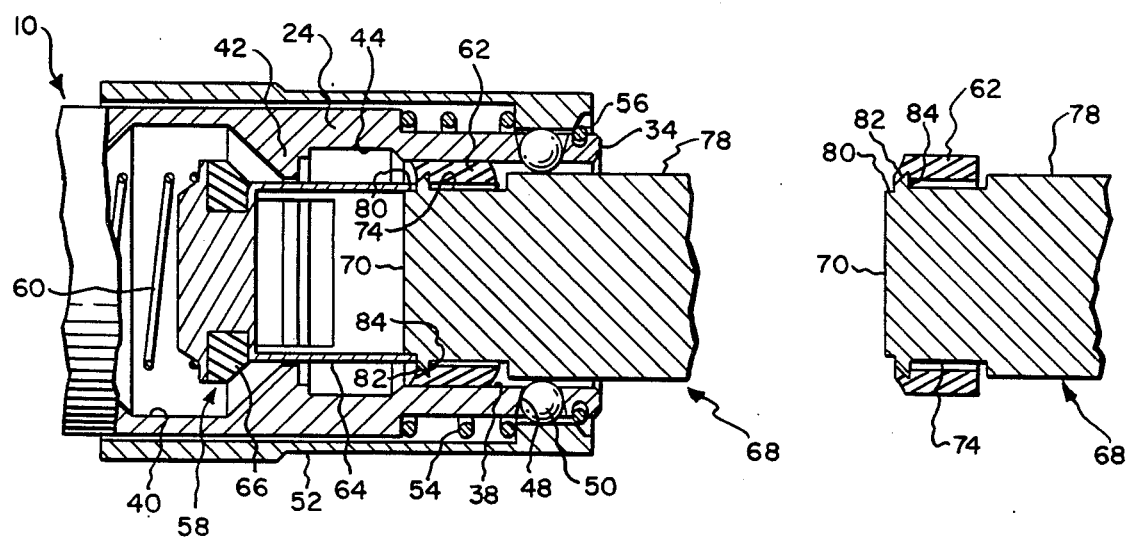
Fig. 6.
Fig. 7.

though the plug, as illustrated, is of conventional construction and includes a cylindrical tubular portion 14 provided with an annular groove 16 on its exterior surface. The plug further includes a flanged portion 18 provided with suitable flats which may be engaged by an open end wrench, and may also be provided with a threaded portion 20.

FLUID COUPLING, SEAL REMOVAL TOOL AND METHOD

TECHNICAL FIELD

The present invention relates generally to the fluid coupling art, and more specifically to a novel female quick connect fluid coupling provided with an axially compressible fluid coupling seal, a novel tool capable of removing the fluid coupling seal from the female quick connect fluid coupling assembly, and a method of using the tool.

BACKGROUND ART

Quick connect fluid couplings are well-known in the art and these devices generally consist of a male coupling member or plug provided with an annular groove on its circumference and a female quick connect fluid coupling assembly or socket provided with ball bearings received within tapered cross holes and a locking collar which is normally biased to a position where the collar maintains the ball bearings within the groove on the plug. One well-known prior art socket is the Jiffy-Matic socket which is provided with an axially compressible coupling seal and which is also provided with a check valve which opens automatically when a plug is received within the socket and which shuts off automatically when disconnected. This form of socket has received widespread acceptance within the industry as the socket is not only reliable in operation but provides an extended life because the coupling seal is replaceable. However, in order to service the seal, it is necessary to disconnect the hose stem portion of the socket from the main body portion. To this end, it is necessary to provide coarse pipe threads on both the hose stem and main body, and it is additionally necessary to provide suitable flats which can be engaged by a wrench to facilitate the turning of the stem with respect to the main body. It is also a time consuming process to disassemble the socket as it is also necessary to remove the valve stem and valve spring from within the main body before the seal can be picked out of the main body. Thus, as presently designed, the Jiffy-Matic sockets do not permit the skirt of the check valve to be shifted entirely out of the coupling seal when assembled to permit the coupling seal to be withdrawn. Also, it is necessary to utilize initial main body and hose stem stock of greater diameter when providing turning flats on the main body and hose stem thus increasing the cost. Also, when reassembling the parts, it is necessary to clean the pipe threads on both the main body and the hose stem and to reapply a new sealant. However, because of the reliable performance of the Jiffy-Matic sockets as well as their greater value due to the replaceable seal, industry has been willing to put up with the inconvenience of the manner in which the seals must be replaced.

Recently, another socket has been introduced which is a nonserviceable design. In this design, the turning flats on the hose stem and the main body have been eliminated thus reducing the cost of these parts, and when the main body and hose stem have been assembled they are bonded together by a thread sealant such as Loctite 620. However, it is not possible to service the coupling seals on these recently introduced sockets and thus, when the coupling seal fails, it is necessary to replace the entire socket.

DISCLOSURE OF INVENTION

It is an object of the present invention to provide a novel female quick connect fluid coupling assembly or socket in which the coupling seal can be readily removed without disassembly of the socket.

It is another object of the present invention to provide a coupling seal removal tool which can be utilized with a novel socket for the rapid removal of the coupling seal without disassembly of the socket.

It is a further object of the present invention to provide a novel process for removing the coupling seal.

In accordance with the foregoing objects, a novel socket is provided in which the skirt of a check valve normally extends at least part way through the coupling seal but which can be shifted entirely out of the coupling seal when the valve spring is fully compressed. A novel tool is provided which can engage the check valve and cause the valve spring to be fully compressed, the tool also being provided with a radially outwardly extending portion having a tapered leading edge which can be inserted into the seal, the radially outwardly extending portion also being provided with a peripheral knife edge which can engage the inner annular surface of the coupling seal to permit its withdrawal from the socket when the tool is moved in a direction away from the socket.

The foregoing objects and other objects and advantages of this invention will be more completely understood after a consideration of the following detailed description taken in conjunction with the accompanying drawings in which a preferred form of this invention is illustrated.

BRIEF DESCRIPTION OF THE DRAWINGS

FIG. 1 is a sectional view through the novel female quick connect fluid coupling assembly or socket of this invention, this view also illustrating a male coupling or plug associated with the female coupling.

FIG. 2 is a side view of a tool which can be utilized to remove the coupling seal from the female coupling shown in FIG. 1.

FIG. 3 is a view of the left hand end of the tool shown in FIG. 2.

FIG. 4 is a view similar to FIG. 1 showing the tool of FIG. 2 partially inserted into the socket.

FIGS. 5 and 6 are further views similar to FIG. 4 showing the tool in its fully inserted position in FIG. 5 and with the seal partially removed in FIG. 6.

FIG. 7 is a view showing the seal on the tool after it has been removed from the socket.

DETAILED DESCRIPTION

Referring first to FIG. 1, a fluid coupling including the novel female quick connect fluid coupling assembly of this invention is illustrated, the female quick connect fluid coupling assembly being indicated generally at 10 and the male portion being indicated generally at 12. The female portion is frequently referred to as a socket, and the male portion is frequently referred to as a plug. The plug, as illustrated, is of conventional construction and includes a cylindrical tubular portion 14 provided with an annular groove 16 on its exterior surface. The plug further includes a flanged portion 18 provided with suitable flats which may be engaged by an open end wrench, and may also be provided with a threaded portion 20.

The socket 10 includes a hose stem 22 and a tubular main body 24. The hose stem is provided with first and second generally cylindrical concentric apertures 26, 28, respectively, the bores 26 and 28 being separated by a shoulder 30. One end portion of the hose stem is adapted to receive a hose or the like, and the other end is provided with external machine threads. Disposed between the two ends is a flange 32 which is adapted to bear against one of the ends of the tubular main body 24.

The tubular main body 24 has first and second spaced apart ends 34, 36, respectively and concentric first and second bores 38, 40, respectively extending towards each other from the first and second ends 34, 36, respectively. The bores are separated from each other by a seat forming web portion 42 provided with an aperture therein. The first bore is provided with a large diameter seal receiving portion 44 adjacent the seat forming web portion. The second bore 40 is provided with female threads 46 adjacent the second end 36. As can be seen from FIGS. 1 and 4, the hose stem 22 is threaded into the tubular main body 24 until the flange 32 abuts against the second end 36. The parts are secured in their assembled position by a thread sealant such as Loctite 620.

The tubular main body is additionally provided with a plurality of tapered cross holes 48 adjacent the first end 34, the holes being adapted to receive ball bearings 50. The ball bearings are normally maintained in a groove engaging position as shown in the various figures by a locking collar 52 which is maintained in its normal locking position by a collar spring 54, one end of the collar spring bearing against an external shoulder on the main body 24 and another end of the collar spring bearing against an internal shoulder on a locking collar 52. When the locking collar 52 has been assembled onto the main body 24, it is maintained in position by a retaining ring 56.

Mounted within the tubular main body is a check valve assembly indicated generally at 58. The valve 58 is biased towards the end 34 by a valve spring 60. In addition, a coupling seal 62 is also received within the annular seal receiving recess 44. The check valve assembly 58 includes an apertured skirt 64 which is normally disposed at least in part within the annular recess of the seal 62. In addition, the check valve is further provided with a valve seal 66 which bears against one wall of the seat forming web portion 42. It can be seen from a comparison of FIGS. 1 and 4, which shows the normal open and closed operating positions of the check valve 58, that in either of these normal positions, the check valve skirt 64 is disposed at least partially within the seal 62. However, it can be seen that the check valve 58 can be shifted entirely out of the coupling seal 62 from an inspection of FIG. 5.

The seal removal tool of this invention is best illustrated in FIGS. 1 and 2 and includes an elongated member indicated generally at 68, the elongated member having spaced apart first and second ends 70, 72, respectively. The elongated member further includes a seal supporting first generally cylindrical portion 74 adjacent the first end 70, a manually engageable second portion 76 adjacent the second end 72, and an intermediate generally cylindrical third portion 78 disposed between the first and second portions 74, 76. The seal supporting first portion 74 is adapted to support a seal on its circumference and to this end it has a length at least equal to the length of the seal and a diameter slightly less than the internal diameter of the seal to be pulled. The intermediate third portion is also adapted to be inserted within the open end of the female quick connect fluid coupling and has an external diameter not greater than the internal diameter of the coupling. Thus, as can best be seen from FIGS. 4 and 5, the external diameter of the third portion is just slightly less than the diameter defined by the ball bearings 50. This facilitates the centering of the tool during its insertion. In addition, there is a small pilot portion 80 which can be inserted within the skirt 64 of the check valve to also facilitate the centering of the tool. The third portion 78 can be provided with any surface which can be easily gripped by a hand, such as a surface found on a conventional screwdriver. Supported on the elongated member is a radially outwardly extending portion which is formed adjacent the first end 70, the radially outwardly extending portion having a tapered leading surface 82 and a normal trailing surface 84, the leading and trailing surfaces joining each other at a knife edge. The distance from the center line of the first generally cylindrical portion, indicated generally at 86, to the knife edge being greater than the internal radius of the annular seal as can best be seen from FIG. 5.

The seal 62 can be readily removed from the novel socket of this invention with the seal removal tool of this invention by simply inserting the tool the full length of the first bore 38 until the valve assumes the position shown in FIG. 5 at which point the radially outwardly extending portion has penetrated the seal 62. By simply withdrawing the tool the seal can also be withdrawn as it can radially collapse into the first portion as it is withdrawn from the annular seal receiving recess 44, the radially outwardly extending portion firmly engaging the seal and causing it to be withdrawn from the socket.

While this invention has been described in detail with respect to one embodiment of a socket and a seal removal tool, other variations should be obvious to those having ordinary skill in the art. Thus, while preferred structures in which the principles of this invention have been incorporated are shown and described above, it is to be understood that the invention is not to be limited to the particular details, shown and described above, but that, in fact, widely differing means may be employed in the practice of the broader aspects of this invention.

What is claimed is:

1. A seal removal tool capable of pulling an annular cylindrical coupling seal from a female quick connect fluid coupling assembly provided with a generally tubular main body having a bore extending from one end of the tubular body to an apertured seat forming portion, the bore being provided with a large diameter seal receiving portion adjacent said apertured seat forming portion, the coupling further including an annular cylindrical coupling seal disposed within said large diameter seal receiving portion, and said coupling further including a check valve having a skirt which passes through said apertured seat forming portion and which may extend into said coupling seal; said tool comprising:

an elongated rod like member having spaced apart first and second ends, a coupling seal supporting generally cylindrical first portion adjacent the first end, a manually engageable second portion adjacent the second end, and an intermediate generally cylindrical third portion disposed between the first and second portions, the coupling seal supporting first portion being adapted to support a coupling seal on its circumference and having a length at least equal to the length of the coupling seal and a diameter less than the internal diameter of the coupling seal to be pulled, the intermediate third portion being adapted to be inserted within the open end of said coupling and having an external diameter not greater than the internal diameter of the coupling, and the length of the first and third portions being at least as great as the length of the bore between the seat forming portion and the open end of the bore, and a radially outwardly extending portion formed adjacent the first end of said rod like member and adapted to be slidably inserted into the seal when the tool is moved in one direction and to engage the seal and cause corresponding movement of the seal when the tool is moved in an opposite direction, said radially outwardly extending portion having a tapered leading surface and a normal trailing surface, the leading and trailing surfaces joining each other at a knife edge, the diameter of the radially outwardly extending portion being greater than the internal diameter of the coupling seal; and wherein the elongated member is further provided with a pilot portion between the first end and the seal supporting first portion, said pilot portion being adapted to engage the skirt of the check valve to center said one end of the rod like member within the coupling.

2. A method of disassembling a resilient cylindrical coupling seal from a female quick connect fluid coupling assembly having a cylindrical bore open at one end and provided with a large diameter seal receiving portion adjacent the other end; said method comprising the following steps:

providing a seal removal tool including an elongated rod like member having a seal supporting generally cylindrical portion adjacent the first end of the elongated member, and an adjacent generally cylindrical portion disposed adjacent the seal support portion, the seal support first portion being adapted to support a resilient cylindrical coupling seal on its circumference and having a length at least equal to the length of said coupling seal, and a diameter less than the internal diameter of the coupling seal and the adjacent portion being adapted to be inserted within the open end of said cylindrical bore and having an external diameter not greater than the internal diameter of said cylindrical bore, the length of the seal supporting portion and the adjacent portion being at least as great as the length of the cylindrical bore between the open end and said other end, said tool further including a radially outwardly extending portion formed on the elongated member adjacent the first end and adapted to be slidably inserted into the resilient cylindrical coupling seal, the radially outwardly extending portion having a tapered leading surface adjacent the first end and a normal trailing surface spaced away from the first end, the leading and trailing surfaces joining each other at a knife edge, and the distance from the center line of the seal supporting portion to the knife edge being fixed at a length greater than the internal radius of the annular cylindrical coupling seal;

inserting said tool into the cylindrical bore of the female quick connect fluid coupling until the radially outwardly extending portion of the tool penetrates the annular inner surface of said resilient coupling seal to cause said coupling seal to be engaged by the radially outwardly extending portion of the tool; and withdrawing the tool and resilient cylindrical coupling seal from the cylindrical bore of the coupling.

3. The method as set forth in claim 2 wherein the female quick connect coupling is further provided with a check valve having a skirt, and a valve spring which biases the check valve to a first position, the skirt, when the valve is in its first portion, extending into the annular cylindrical coupling seal; and wherein the skirt of the check valve is shifted entirely out of the annular cylindrical coupling seal during the insertion step.

4. A female quick connect fluid coupling assembly adapted to receive a male coupling; said female coupling assembly comprising:

a hose stem provided with male threads to one end and a first bearing surface against which a valve spring may bear;

a generally tubular main body having spaced apart first and second ends, and concentric first and second bores extending towards each other from said first and second ends, respectively, said first and second bores being separated from each other by an apertured seat forming portion, said first bore being provided with an enlarged diameter coupling seal receiving portion adjacent said seat forming portion, and said second bore being provided with female threads adjacent the second end, the hose stem being threaded into the second bore;

a resilient cylindrical coupling seal disposed within said enlarged diameter seal receiving portion;

a check valve disposed within the main body, the check valve having a valve seal disposed within the second concentric bore and adapted to bear against the seat forming portion, a skirt which passes through said apertured seat forming portion and which extends into said coupling seal when the valve seal is bearing against the seat forming portion, and a second bearing surface against which a valve spring may bear; and a compressible valve spring contacting said first and second bearing surfaces and shiftable between an extended position and a compressed position;

the distance between the coupling seal and the first bearing surface being greater than the combined length of the valve spring when in said compressed position and the length of that portion of the check valve which extends from the second bearing surface to the end of the skirt remote from the second bearing surface, said spring when in the extended position causing said valve seal to bear against said apertured seat forming portion and when in the compressed position permitting the skirt of the check valve to be shifted into the second bore to such an extent that the skirt portion is not within the coupling seal, whereby the coupling seal may be readily removed.

5. A seal removal tool capable of pulling a resilient cylindrical seal from a cylindrical bore within the main body of a female coupling, said bore having an enlarged diameter coupling seal receiving portion and an open end; said tool comprising an elongated rod like member provided with spaced apart first and second ends,
a coupling seal supporting generally cylindrical first portion adjacent the first end,
a manually engageable second portion adjacent the second end, an intermediate generally cylindrical third portion disposed between the first and second portions, and a radially outwardly extending portion formed adjacent said first end of said elongated rod like member, said radially outwardly extending portion having a tapered leading surface adjacent the first end and a normal trailing surface spaced away from the first end, the leading and trailing surfaces joining each other at a knife edge, the parts being so arranged and constructed that the seal supporting first portion is adapted to support the coupling seal on its circumference and has a length at least equal to the length of the coupling seal and a diameter less than the internal diameter of the coupling seal to be pulled, the intermediate third portion is adapted to be inserted within the open end of said bore and has an external diameter not greater than the internal diameter of the bore, the length of the first and third portions is at least as great as the length of the bore between the enlarged diameter coupling seal receiving portion and the open end of the bore, the radially outwardly extending portion is adapted to be slidably inserted into the coupling seal when the tool is moved in one direction and to engage the coupling seal and cause corresponding movement of the coupling seal when the tool is moved in an opposite direction, and the diameter of the radially outwardly extending portion is greater than the internal radius of the coupling seal.

6. The seal removal tool as set forth in claim 5 wherein the elongated member is further provided with a pilot portion between the first end and the seal supporting first portion, said pilot portion being adapted to engage a portion of the female coupling to center said one end of the elongated member within the bore.

* * * * *